UNITED STATES PATENT OFFICE.

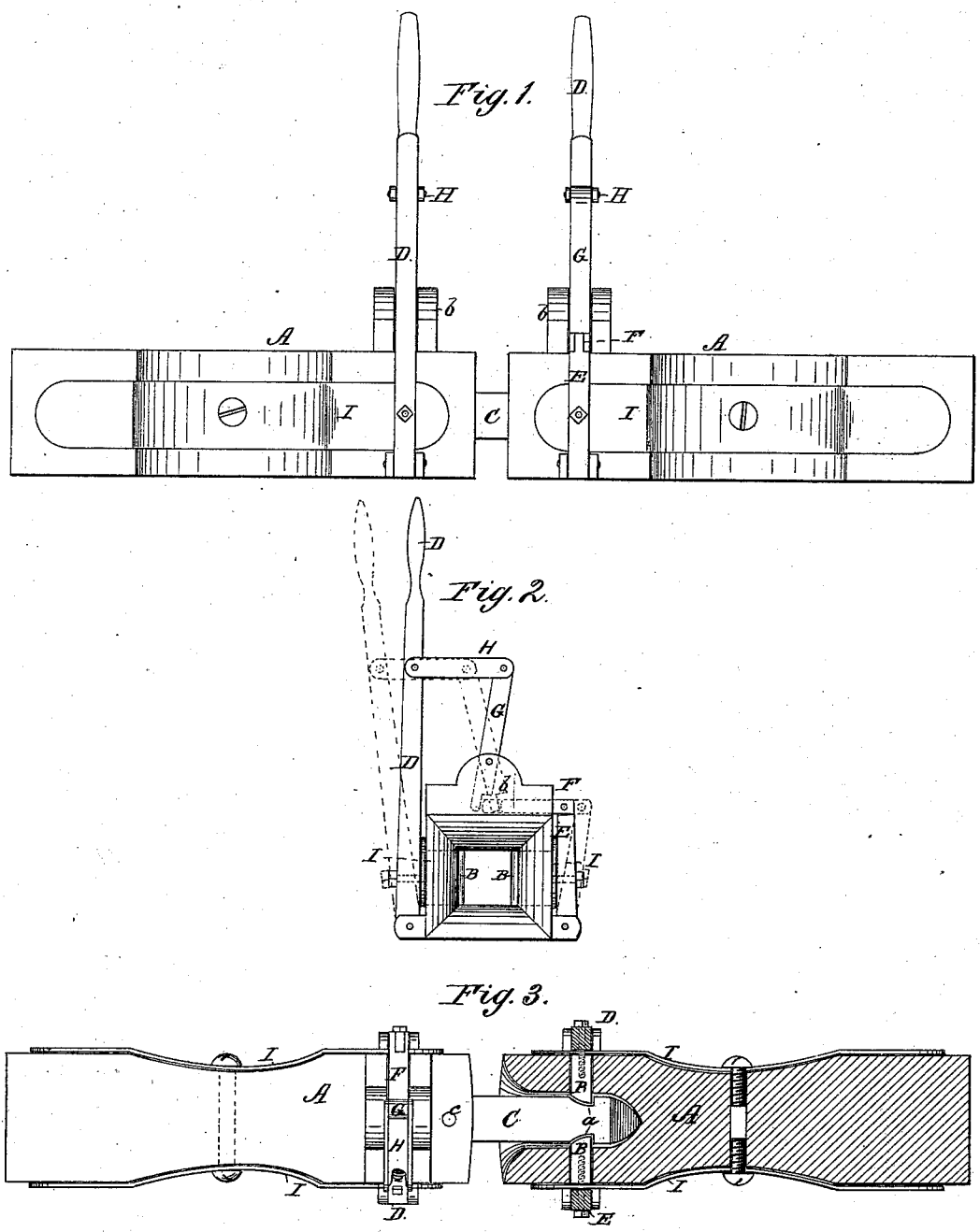

JAMES H. HENLEY, OF LEADVILLE, COLORADO.

CAR-COUPLING.

SPECIFICATION forming part of Letters Patent No. 225,129, dated March 2, 1880.

Application filed October 4, 1879.

*To all whom it may concern:*

Be it known that I, JAMES HENRY HENLEY, of Leadville, in the county of Lake and State of Colorado, have invented a new and Improved Car-Coupling; and I do hereby declare that the following is a full, clear, and exact description of the same.

My invention is an improvement in the class of automatic car-couplings in which a bar is employed as the connecting device in place of the link, and is made to engage with spring jaws or catches located within the draw-heads, such jaws or catches being operated by levers and connecting-rods for the purpose of withdrawing them from engagement with the bar when it is desired to uncouple.

My invention is embodied in the combination and arrangement of plate-springs with the draw-head and jaws that engage the draw-bar, and also with the levers that operate said jaws, as hereinafter described and claimed.

In the accompanying drawings, forming part of this specification, Figure 1 is a side view of my improved coupling. Fig. 2 is a front view of one of the draw-heads and its attachments. Fig. 3 is a plan view of one draw-head and horizontal section of the other and their attachments.

The draw-heads A A may be constructed solid in whole or in part, but must in any case be provided with lateral slots near the front end to receive the jaws or catch-blocks B B. The latter are beveled on the inner side to adapt them to engage with the coupling-bar C, which has pointed ends and square shoulders *a*, formed by cutting away a portion of the sides of the bar.

The jaws B B are attached to levers D E, which are arranged vertically on opposite sides of the draw-heads, being pivoted at the lower end. The lever D is extended above the draw-head sufficiently to adapt it for use as a hand-lever, and its upper portion is connected, by a link, F, with a third lever, G, which is pivoted in a slotted block, *b*, attached to the top side of the draw-head. The lower end of such third lever G is connected, by a second bar or link, H, with the upper end of the short side lever, E.

The jaws B B are pressed inward and the levers D E held upright and parallel by plate-springs I, attached to the sides of the draw-heads, and whose free ends project forward between the jaws and levers.

The thickness of the coupling-bar C exceeds the width of the space between the jaws B, so that when it enters one of the draw-heads its head forces the jaws farther apart in the first instance, but the lateral grooves or recesses of the coupling-bar allow the jaws to quickly approach each other again, and thus gripe the bar and lock with its shoulders, as shown in Fig. 3.

In order to retract the jaws B, and thus release the coupling-bar, the lever D is moved to the left, Fig. 2, which moves the lever G into corresponding position and throws the upper end of short lever E outward from the draw-head, as shown in dotted lines, same figure.

The thickness and strength of the coupling-bar C enable it to act as a buffer upon entering a draw-head, so that the draw-heads do not come in contact.

Each draw-head is provided with a hole, *c*, in its front end, so that in case the bar C should, for any reason, be dispensed with, or its use be impracticable—as, for instance, when a car provided with my improvement is to be connected with one having the usual form of link-coupling—then a pin may be inserted in said hole *c* to engage with a link.

I do not claim operating the movable jaws of a coupling by levers which are pivoted to the sides of the draw-bar and connected by rods or bars; and I am also aware that a coupling-pin has been provided with a spring for holding it engaged with a link.

What I claim is—

The combination of the plate-springs I I with the slotted draw-head, the jaws B B, and the levers D E and their connecting-bars F H, said springs being applied to the outer sides of the draw-head interposed between the levers and jaws, thus serving to hold both in the position shown and described.

JAMES HENRY HENLEY.

Witnesses:
D. CLINTON LYLES,
JAMES C. LANGHORNE.